United States Patent [19]
Dionne

[11] 3,801,170
[45] Apr. 2, 1974

[54] SLEEVED, BOWED ROLL LUBRICATION

[75] Inventor: Robert A. Dionne, Hollis, N.H.

[73] Assignee: W. P. Evans & Son Limited, Manchester, England

[22] Filed: Sept. 28, 1972

[21] Appl. No.: 293,075

[52] U.S. Cl. .............................. 308/107, 308/187
[51] Int. Cl. ..................... F16c 1/24, F16c 33/66
[58] Field of Search ............. 308/107, 187; 184/39

[56] References Cited
UNITED STATES PATENTS
3,430,731  3/1969  Satzinger ............................. 184/39

Primary Examiner—Charles J. Myhre
Assistant Examiner—Frank Susko
Attorney, Agent, or Firm—Pearson & Pearson

[57] ABSTRACT

An improved method and apparatus for lubricating bearings in a closed elongate structure comprising placing a fluid-distendable tubular member within the structure, placing a lubricant about the outer surface of the tubular member, and causing the lubricant to be displaced radially to those sites within the elongate structure which require lubrication. The displacement is achieved by applying fluid pressure within the tubular member from an exterior source as lubrication is needed. The invention finds particularly advantageous application in the manufacture and maintenance of bowed spreader rolls of the type used in the processing of paper, film textiles, and the like.

12 Claims, 4 Drawing Figures

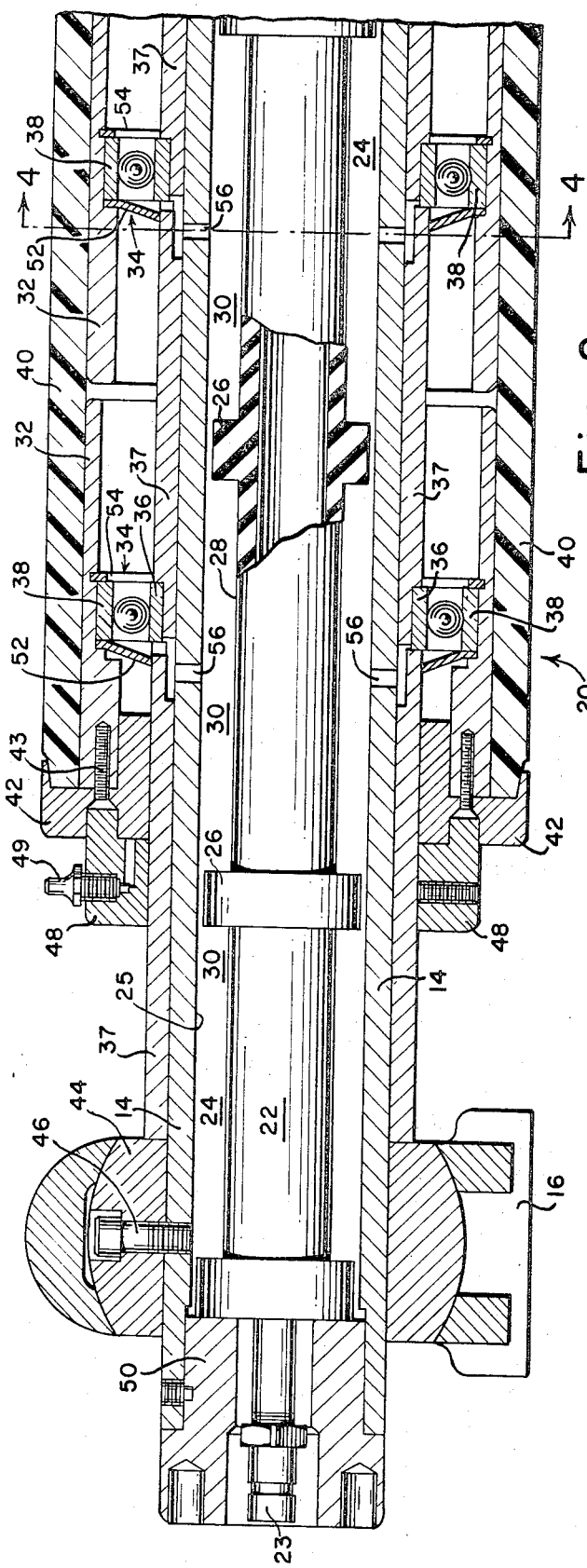
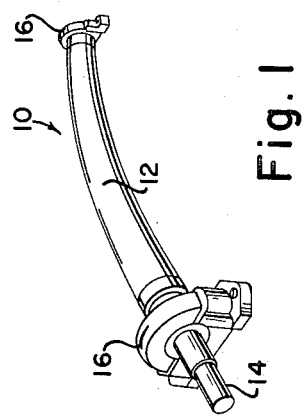
Fig. 2
Fig. 1

SLEEVED, BOWED ROLL LUBRICATION

BACKGROUND OF THE INVENTION

This invention relates to improved rolls of the type used in web processing and, in particular, to an improved process for lubricating the internal bearings of such elongate structures.

In processing of web materials, bowed spreader rolls are utilized to aid in maintaining uniform tension and consequent wrinkle-free processing of the web. These bowed rolls are generally constructed by assembling a bowed shaft mounted in brackets on the processing machine. This bowed shaft does not itself rotate, but has a series of bearings mounted along it. The inner races of these bearings, i.e. those adjacent the bowed shaft, are fixed to the shaft. The outer races of the bearings are free to rotate. These bearings carry cylinders or spools which are spaced along the roll and form a bowed support means about the central shaft. An elastomeric sleeve is then slipped over the roll to form the smooth bowed surface which will contact the web of paper, film, or the like, during processing.

One operating problem is recurrent with all such rolls (and, indeed, all such similar structures) known to the prior art: there has been no economical way to assure that the bearings, and especially those bearings most remote from the ends of the roll, receive satisfactory lubrication. The most common procedure for attempting such lubrication has been to cut a slot into the stationary shaft, that slot communicating with the bearings along the shaft, and attempting to force lubricant from one end along the shaft to the bearings. This has resulted in poor lubrication of the more remote bearings and, sometimes, too much lubrication of the bearings nearest the source of lubricant.

Although the precise problem described above has not been solved in the known art, a number of other techniques for achieving remote or semi-permanent lubrication are described in the art. For example, U. S. Pat. No. 1,493,765 to W. E. Philips describes a spring-biased feed of lubricant to each roll mounted across a conveyor belt supporting shaft. Philips' apparatus does not require supplying of lubricant from remote points and the rolls are not enclosed within a sleeve.

Fluid-permeable and porous bearings have been quite popular, as indicated by such patents as U. S. Pat. Nos. 2,885,249 and 3,374,039 to Gerald and Voorhies, respectively. None of these disclosures is believed to suggest a convenient and economical way to solve the problems encountered by the instant inventor.

SUMMARY OF THE INVENTION

It is an object of the present invention to provide an improved lubrication system for a rotatable roll of the type comprising bearings spaced in ernally along the length thereof and enclosed in a sleeve.

It is another object of the invention to provide a bowed roll having improved lubrication means and requiring less maintenance attention than such rolls known to the prior art.

Another object of the invention is to provide a novel lubricating module useful with an elongate structure comprising bearings internally along the length thereof.

A further object of the invention is to provide an improved process for lubricating bearings mounted internally along an elongate structure and remote from the ends thereof.

Other objects of the invention will be clear to those skilled in the art on reading this application.

The above objects have been achieved by apparatus comprising a hollow elongate shaft within the rotatable structure. Inside the shaft is placed a hollow pressure-expansible sleeve having a supply of lubricant about the outer surface thereof. The outer wall of the hollow shaft carries bearings on which rings carrying a roll-facing material rotate. Conduits through the wall of the inner shaft provide means by which lubricant, in response to expansion of the sleeve, flow to each bearing. In effect, the bearings are lubricated via a parallel flow of lubricant, rather than a series flow, as had been the case in prior lubrication of such remote non-accessible bearings.

In a particularly advantageous form of the invention, the expansible sleeve and grease are formed into an integral lubrication means, i.e. a module with solid grease forming a cylindrical coating on the outer face of the sleeve. The sleeve preferably carries a number of circular ribs which form means, not only to help retain the grease in position on the module by providing lateral support and an adhering surface therefor, but which also function to minimize lateral flow of grease along the sleeve during use of the lubrication means.

ILLUSTRATIVE EXAMPLE OF THE INVENTION

In this application and accompanying drawings, there is shown and described a preferred embodiment of the invention and various alternatives and modifications thereof are suggested, but it is to be understood that these are not intended to be exhaustive and that other changes and modifications can be made within the scope of the invention. These suggestions herein are selected and included for purposes of illustration, in order that others skilled in the art will more fully understand the invention and the principles thereof and will be able to modify it and embody it in a variety of forms, each as may be best suited in the condition of a particular case.

IN THE DRAWING

FIG. 1 is a perspective view of a typical bowed roll of the type to which the invention is advantageously applied;

FIG. 2 is a front elevation, in half section of one end, of a bowed roll incorporating the lubricating means of the invention;

Referring to FIG. 1, it is seen that bowed roll 10 comprises a smooth polymeric facing 12 and is journalled by shaft 14 in brackets 16.

Figure 3:
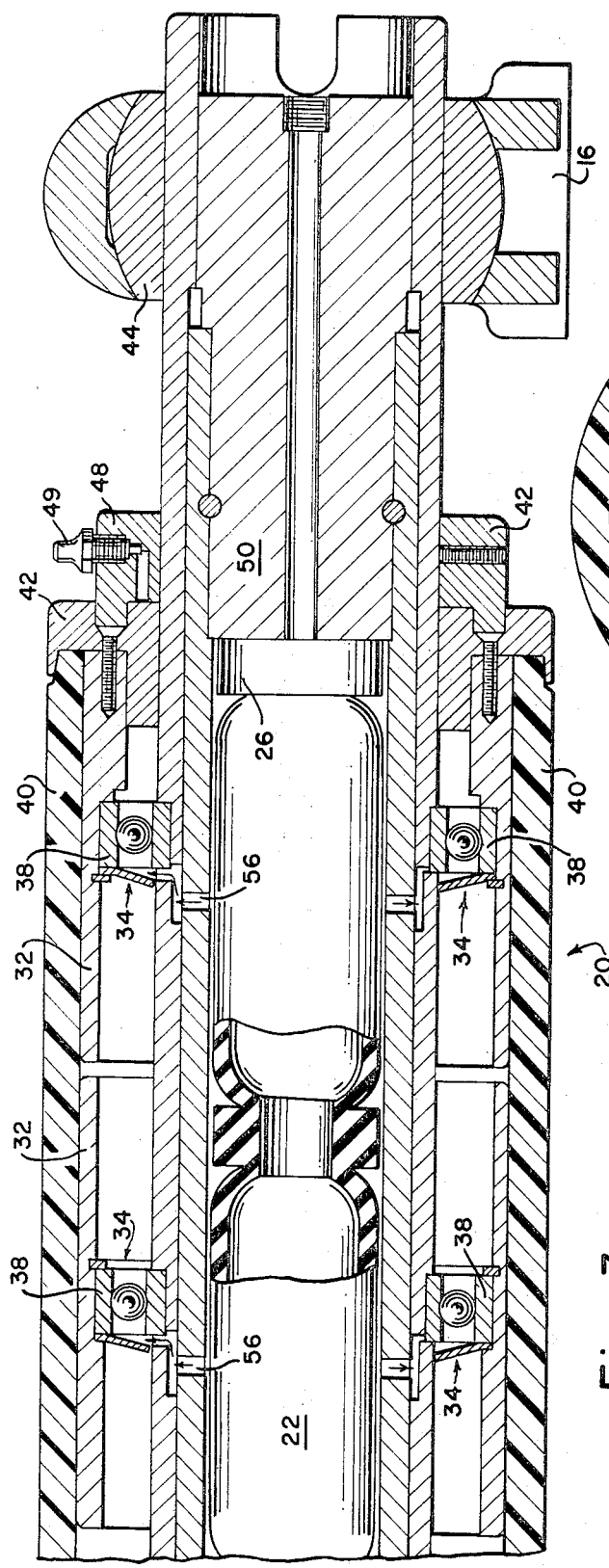
FIG. 3 is a section similar to that shown in FIG. 2, of the other end of the roll with the sleeve of the lubricating means in expansible form.
Figure 4:
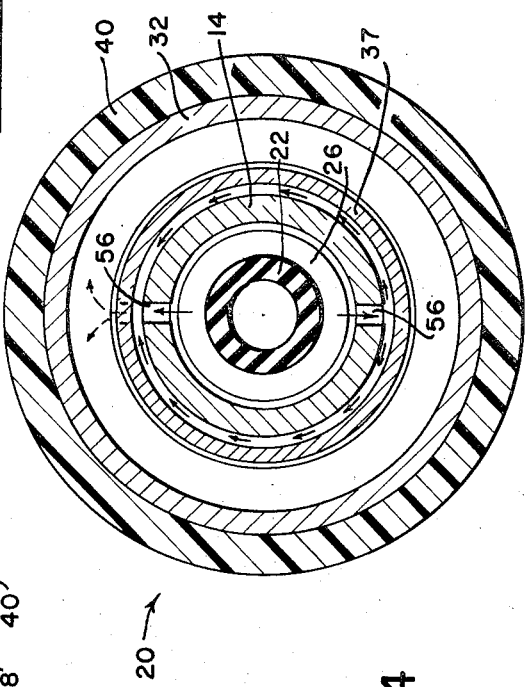
FIG. 4 is a cross sectional view of the roll shown in FIG. 2 on line 4—4 thereof.

FIGS. 2 and 3 illustrate a bowed roll 20, constructed according to the invention. Roll 20 of FIGS. 2 through 4 is constructed as follows.

A pressure-inflatable support tube 22 is provided with a fluid inlet fixture 23 and is positioned in a central conduit 24. Spacers, or ribs, 26 are mounted, say about every 6 inches or so, along, and preferably integral with, the outer face 28 of tube 22. Between tube 22 and wall 25 of a stationary bowed shaft 14 is a supply of solid grease 30. The grease is desirably non-flowable. By this, it is meant that the grease will not tend to flow off the tube at temperatures below about 75° F when the grease is under no stress. The grease is desirably first molded about the tube in the spaces between the ribs 26 and then the tube is slid into the shaft 14. The grease is divided into a series of generally cylindrical increments by spacers 26. However, enough grease is provided to cover the spacers and facilitate the sliding of the grease-covered tube into shaft 14.

Along the outside of the bowed shaft 14 is a series of spools 32 which are about 6 inches in length and mounted for rotation around shaft 14 by means of bearings 34. Inner races 36 of bearings 34 are fixed to shaft 14 by means of fixed locating sleeves 37, while the outer race 38 is free to rotate with spools 32 and a polymer roll-facing material, or elastomeric sleeve, 40 which covers spools 32, thereby providing a smooth outer face for the roll. Those spools 32 at each end of the roll are restrained by end caps 42 held by fasteners 43 to the outermost spools 32.

The outermost locating sleeves 37 are positioned by pillow blocks 44 and fastened to shaft 14 by fasteners 46. Labyrinth rings 48 are mounted adjacent the end cap and provided with a lubricating fixture 49 which facilitates providing any required lubrication to the interface between end caps 42 and labyrinth rings 48. Inflatable tube 22 is restrained within shaft 14 by means of end plugs 50.

It has been found particularly desirable to provide each bearing 34 with a grease deflecting ring 52 and grease restraining ring 54. Ring 52 is mounted proximate the ends of locating sleeves 37, by which grease is passed to the bearings, and tends to deflect the grease into the bearings proper. Restraining rings 54 merely keep the grease from flowing unnecessarily out of the bearing.

In operation, it is contemplated that pneumatic or hydraulic pressure will be applied to inflatable tube 22 as lubrication is required. On application of such pressure, grease 30 will be pushed radially through conduits 56 in shaft 14 into bearings 34. When the supply of grease runs low or becomes exhausted, the sleeve can be conveniently removed, reconstructed by being packed with a new grease supply, and then reinserted into the roll assembly.

It should be understood that when the invention is used with bowed rolls, the grease-packed lubricating means is to be flexible in its non-expanded case so that it can be conformed to the shaft into which it must be placed. Of course, this requirement does not hold true for lubricating means which are placed into straight structures.

It should also be understood that it is preferable for spacers 26 to have some resiliency as, for example, possessed by the integral spacers formed of expansible material and shown in the drawings. However, this is not absolutely necessary, so long as the relationship in rigidity between spacer and inflatable sleeve is such as to allow expansion of the sleeve and to allow the spacers to act as dividers and flow-restrictors along the length.

It will thus be seen that the objects set forth above, among those made apparent from the preceeding description, are efficiently attained and, since certain changes may be made in the above construction without departing from the scope of the invention, it is intended that all matter contained in the above description or shown in the accompanying drawings shall be integrated as illustrative and not in a limiting sense.

I claim:

1. A lubricating module comprising:
    a hollow inflatable support member, a supply of non-flowable grease molded about the outside of said support member, and a means to pressurize a fluid in said hollow support member;
    said means including a fluid inlet fixture for connecting said module to an exterior source of fluid pressure;
    whereby said pressure may be applied to said module as lubrication is required.

2. A lubricating module as defined in claim 1, wherein said module comprises, additionally:
    spacers mounted along the outside of said support member;
    said spacers defining a series of compartments, each containing an increment of said grease.

3. A lubricating module as defined in claim 2, wherein:
    said compartments and said increments of grease are generally cylindrical in shape; and
    said support member is generally elongate in shape.

4. In apparatus of the type comprising bearings which are inaccessible from the exterior of the structure, the improvement wherein:
    a lubricating module, comprising a hollow, inflatable support member, a supply of non-flowable grease molded about the outside of said support member, and means to pressurize a fluid in said hollow support member, is placed within the structure,
    said means to pressurize said fluid being accessible from the exterior of said apparatus.

5. Apparatus as defined in claim 4, wherein said module comprises, additionally:
    spacers mounted along said support member, defining a series of increments of grease; and
    forming means to inhibit flow of said grease from compartment to compartment.

6. Apparatus as defined in claim 4, wherein said module comprises, additionally:
    spacers mounted along the outside of said support member and defining a series of sections of grease from one spacer to the next.

7. Apparatus as defined in claim 6, wherein:
    said apparatus is an elongated roll having bearings located between a fixed inner shaft and a rotatable outer facing;
    said shaft having grease passages leading from each said section of grease to the adjacent bearing.

8. Apparatus as defined in claim 7, wherein:
    said apparatus is a bowed roll.

9. Apparatus as defined in claim 7, wherein:
    said inflatable sleeve is enclosed within a hollow shaft;
    said shaft includes passages forming means for said grease to enter said bearings; and
    each bearing has a housing comprising shield means to direct and retain said lubricant in said bearings.

10. A process for lubricating bearings located in a remote position of a structure, comprising the steps of:
    maintaining a supply of grease about an inflatable support member within said structure;

providing a source of fluid pressure exterior to said inflatable support member; and periodically applying pressure to said inflatable support member from said exterior source as lubrication is needed by said bearings, to further inflate said support member, thereby driving grease into said bearings.

11. In a bowed roll, of the type having a hollow shaft with a series of bearings spaced therealong, a series of spools carried on the bearings and an elastomeric facing sleeve over the spools, the combination of:

an inflatable tube within said shaft having annular ribs spaced therealong, forming a series of axially-extending grease compartments each opposite one of said bearings;

grease passages in said shaft connecting each said compartment to one of said bearings; and means at one end of said tube for applying inflation pressure thereto.

12. In combination with a sleeved, bowed roll having a hollow shaft and spaced bearings and spools therealong:

a grease passage through the wall of said shaft proximate each bearing, connecting said bearing with the interior of said shaft; and a replaceable grease module, or cartridge, axially slidable in and out of said hollow shaft from one end thereof, said cartridge comprising an expansible member having spaced annular ribs therealong, and having means for expanding the same from one end thereof;

said ribs each defining a grease compartment therebetween, leading to one of said grease passages for forcing grease to each said bearing, while said sleeved roll is in operation.

* * * * *